(12) United States Patent
Timariu et al.

(10) Patent No.: US 9,961,545 B2
(45) Date of Patent: May 1, 2018

(54) SYSTEMS, METHODS, AND APPARATUS FOR AUTHENTICATION DURING FAST INITIAL LINK SETUP

(71) Applicant: QUALCOMM Incorporated, San Diego, CA (US)

(72) Inventors: Luiza Timariu, San Diego, CA (US); George Cherian, San Diego, CA (US); Abhishek Pramod Patil, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/726,254

(22) Filed: May 29, 2015

(65) Prior Publication Data

US 2015/0350907 A1    Dec. 3, 2015

Related U.S. Application Data

(60) Provisional application No. 62/007,316, filed on Jun. 3, 2014.

(51) Int. Cl.
| | |
|---|---|
| *H04W 12/06* | (2009.01) |
| *H04W 52/02* | (2009.01) |
| *H04L 29/06* | (2006.01) |
| *H04W 84/12* | (2009.01) |

(52) U.S. Cl.
CPC ............ *H04W 12/06* (2013.01); *H04L 63/08* (2013.01); *H04W 52/02* (2013.01); *H04W 52/0216* (2013.01); *H04W 52/0219* (2013.01); *H04W 52/0229* (2013.01); *H04W 84/12* (2013.01); *H04L 63/06* (2013.01); *Y02B 60/50* (2013.01)

(58) Field of Classification Search
CPC ......... H04L 63/08; H04L 63/06; H04W 12/06
See application file for complete search history.

(56) References Cited

U.S. PATENT DOCUMENTS

| | | | |
|---|---|---|---|
| 2013/0114463 A1* | 5/2013 | Li | H04W 48/18 370/254 |
| 2013/0117820 A1* | 5/2013 | Cherian | H04L 63/06 726/4 |
| 2013/0176897 A1 | 7/2013 | Wang et al. | |

(Continued)

OTHER PUBLICATIONS

Devin Akin, Robust Security Network (RSN) Fast BSS Transition (FT), Sep. 2008, CWNP, https://www.cwnp.com/uploads/802-11_rsn_ft.pdf.*

(Continued)

*Primary Examiner* — Khang Do

(74) *Attorney, Agent, or Firm* — Knobbe, Martens, Olson & Bear, LLP

(57) ABSTRACT

Systems, methods, and devices for authentication during fast initial network link setup within wireless communication systems are disclosed. In one aspect, a method for wireless communication is provided. The method includes generating an aggregated message, the aggregated message comprising a pairwise master key identifier (PMKID) and an extensible authentication protocol re-authentication protocol (EAP-RP) frame. The method further includes transmitting the aggregated message.

12 Claims, 7 Drawing Sheets

(56) References Cited

U.S. PATENT DOCUMENTS

| | | | | |
|---|---|---|---|---|
| 2013/0247150 A1* | 9/2013 | Cherian | ............. | H04L 63/0815 |
| | | | | 726/4 |
| 2013/0263223 A1* | 10/2013 | Cherian | ............... | H04L 9/0869 |
| | | | | 726/4 |
| 2014/0010223 A1* | 1/2014 | Wang | ................... | H04W 48/12 |
| | | | | 370/338 |
| 2014/0050320 A1* | 2/2014 | Choyi | .................... | H04L 63/08 |
| | | | | 380/270 |

OTHER PUBLICATIONS

Narayanan et al., EAP Extensions for EAP Re-authentication Protocol (ERP), Aug. 2008, https://tools.ietf.org/pdf/rfc5296.pdf.*
Kamarthy et al., PMK Caching for FILS, Jan. 10, 2014, https://mentor.ieee.org/802.11/dcn/14/11-14-0052-02-00ai-pmk-caching-with-fils.docx (Year: 2014).*
International Search Report and Written Opinion—PCT/US2015/033527—ISA/EPO—dated Aug. 25, 2015.

* cited by examiner

SYSTEMS, METHODS, AND APPARATUS FOR AUTHENTICATION DURING FAST INITIAL LINK SETUP

CROSS REFERENCE TO RELATED APPLICATIONS

This application claims priority under 35 U.S.C. § 119(e) to U.S. Provisional Patent Application No. 62/007,316 titled "SYSTEMS, METHODS, AND APPARATUS FOR AUTHENTICATION DURING FAST INITIAL LINK SETUP" filed on Jun. 3, 2014, which is hereby incorporated by reference in its entirety.

BACKGROUND

Field

The present application relates generally to wireless communication systems and more specifically to systems, methods, and devices for authentication during fast initial network link setup within wireless communication systems.

Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or when the network architecture is formed in an ad hoc, rather than fixed, topology. A mobile network element such as a wireless station (STA) and an access point (AP) can exchange messages through a process of link setup for utilizing the network. Under certain conditions, many STAs can attempt to use the network during a short period of time. For example, when several STAs move into the vicinity of a new network, the network can experience an increased rate of link setup process collisions creating undesirable latencies in the link setup. Accordingly, there is a need for a fast initial link setup in a wireless communication network.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of this disclosure provides a method for communicating data in a wireless communications network. The method includes generating an aggregated message. The aggregated message comprising a pairwise master key identifier (PMKID) and an extensible authentication protocol re-authentication protocol (EAP-RP) frame. The method further includes transmitting the aggregated message.

Another aspect of this disclosure provides an apparatus for communicating data in a wireless communications network. The apparatus comprises a processor configured to generate an aggregated message, the aggregated message comprising a pairwise master key identifier (PMKID) and an extensible authentication protocol re-authentication protocol (EAP-RP) frame. The apparatus further includes a transmitter configured to transmit the aggregated message.

Another aspect of this disclosure provides a computer readable storage medium comprising instructions that when executed cause a processor to perform a method of wireless communication. The method includes generating an aggregated message. The aggregated message comprising a pairwise master key identifier (PMKID) and an extensible authentication protocol re-authentication protocol (EAP-RP) frame. The method further includes transmitting the aggregated message.

Another aspect of this disclosure provides an apparatus for communicating data in a wireless communications network. The apparatus comprises means for generating an aggregated message, the aggregated message comprising a pairwise master key identifier (PMKID) and an extensible authentication protocol re-authentication protocol (EAP-RP) frame. The apparatus further comprises means for transmitting the aggregated message.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
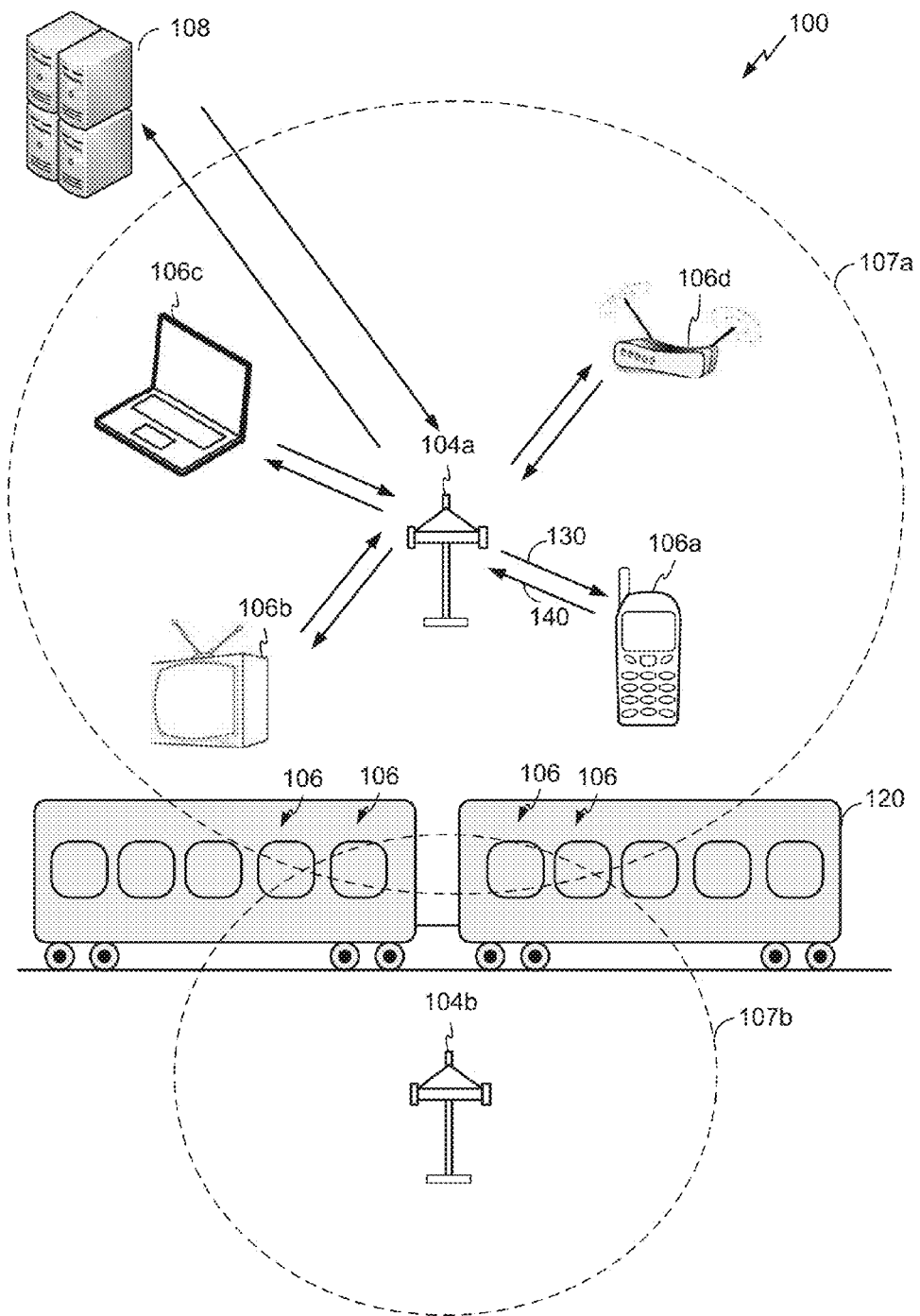
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104a, which communicates with a plurality of stations (STAs) 106a-106d in a basic service area (BSA) 107a. The wireless communication system 100 can further include a second AP 104b which can communicate in a BSA 107b. One or more STAs 106 can move in and/or out of the BSAs 107a-107b, for example, via a train 120 or other transportation. In various embodiments described herein, the STAs 106 and 106a-106d can be configured to quickly establish wireless links with the AP 104a and/or 104b, particularly when moving into the BSAs 107a and/or 107b. The wireless communication system 100 can further include an authentication server 108. The authentication server 108 may comprise a server that provides authentication services, such as identity verification, authorization, privacy, and non-repudiation.

Generally, in IEEE 702.1X protocols, authentication takes place between a STA (e.g., STA 106) and an authentication server (e.g., authentication server 108). Authentication of STAs and association of the STA to an AP provides a method for supplying different levels of access to different STAs in a wireless local area network (WLAN). Each STA and AP in the WLAN is required to keep an authentication state and an association state with each other STA and AP that it is in contact with. Authentication is how a STA gains access to the network. It provides proof of identity to ensure the STA is allowed access to the network. A Pairwise Master Key (PMK) is a key that results from a successful authentication between a STA and an AP. The PMK is generally derived by the STA and the authentication server after a successful extensible authentication protocol (EAP) authentication and is then sent to the AP. Once a STA has been authenticated it may become associated with an AP.

The various fast initial link setup (FILS) implementations described herein can provide enhanced system performance under a variety of use conditions. In some embodiments, when a large number of STAs 106 move into range of an AP 104a and/or 104b, they can create a large amount of wireless traffic, for example, in an attempt to establish a wireless link with the AP 104a. In some instances, the STAs 106 can generate hundreds of connection attempts per second. A high number of STAs 106 requesting access can cause packet collisions and/or dropping of packets, thereby potentially reducing network performance and increasing latency. The increased latency may cause STAs 106 to remain idle for longer periods of time, thereby increasing power consumption. Accordingly, a faster initial link setup that utilizes techniques for allowing STAs 106 to enter a sleep state (e.g., an inactive state, a state in which some or all of the components of the STAs 106 are powered down to reduce power consumption, etc.) during the connection process can reduce power consumption. As described in greater detail herein, the devices 106 and 104a-104b can implement various techniques to reduce power consumption, and thereby enhance network performance.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, 802.11ah, and/or 802.11ai protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access (e.g., for use with hotspots), machine-to-machine (M2M) communications, etc.

The APs 104a-104b can serve as a hub or base station for the wireless communication system 100. For example, the AP 104a can provide wireless communication coverage in the BSA 107a, and the AP 104b can provide wireless communication coverage in the BSA 107b. The AP 104a and/or 104b can include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

The STAs 106 and 106a-106d (collectively referred to herein as STAs 106) can include a variety of devices such as, for example, laptop computers, personal digital assistants (PDAs), mobile phones, etc. The STAs 106 can connect to, or associate with, the APs 104a-104b via a WiFi (e.g., IEEE 802.11 protocol such as 802.11ai) compliant wireless link to obtain general connectivity to the Internet or to other wide area networks. The STAs 106 may also be referred to as "clients."

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104a, along with the STAs 106a-106d associated with the AP 104a, and that are configured to use the AP 104a for communication, can be referred to as a basic service set (BSS). In some embodiments, the wireless communication system 100 may not have a central AP 104a. For example, in some embodiments, the wireless communication system 100 can function as a peer-to-peer network between the STAs 106. Accordingly, the functions of the AP 104a described herein can alternatively be performed by one or more of the STAs 106. Moreover the AP 104a can implement one or more aspects described with respect to the STAs 106, in some embodiments.

A communication link that facilitates transmission from the AP 104a to one or more of the STAs 106 can be referred to as a downlink (DL) 130, and a communication link that facilitates transmission from one or more of the STAs 106 to the AP 104a can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104a and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104a and the STAs 106 in accordance with OFDM/OFDMA processes. Accordingly, the wireless communication system 100 can be referred to as an OFDM/OFDMA system. As another example, signals can be sent and received between the AP 104a and the STAs 106 in accordance with CDMA processes. Accordingly, the wireless communication system 100 can be referred to as a CDMA system.

Aspects of certain devices (such as the AP 104a and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

Figure 2:
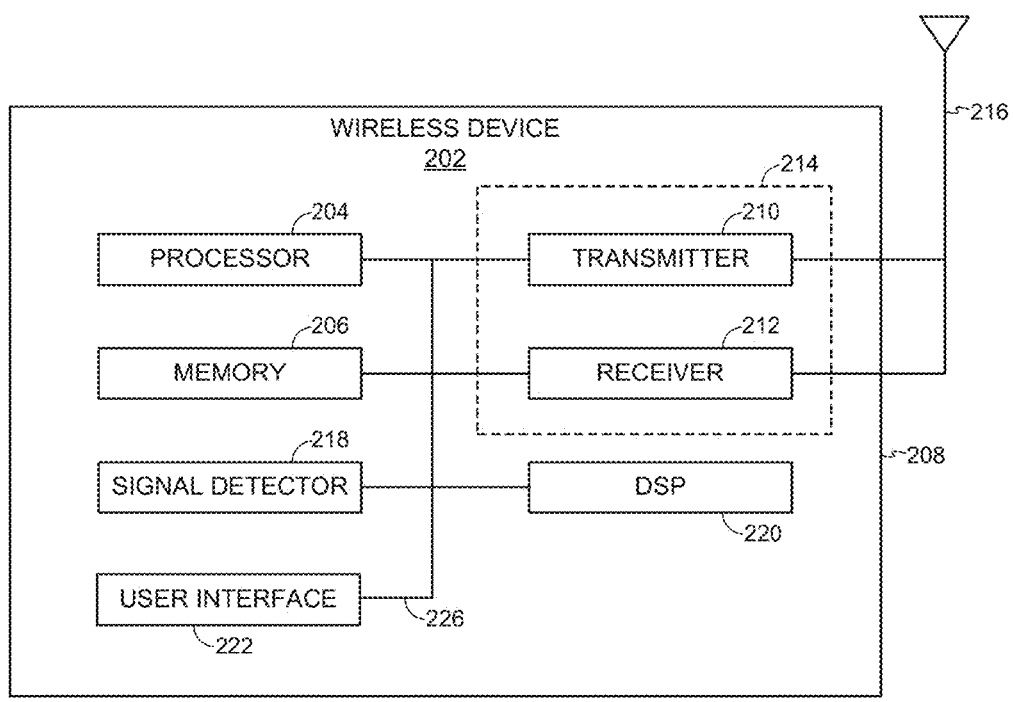
FIG. 2 illustrates a illustrative embodiment of a wireless device of one or more of the mobile devices of FIG. 1.

FIG. 2 shows an exemplary functional block diagram of a wireless device 202 that may be employed within the wireless communications system 100 of FIG. 1. The wireless device 202 is an example of a device that may be configured to implement the various methods described herein. For example, the wireless device 202 may comprise one of the stations 106a-d.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. Although not shown, the wireless device 202 may also include multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise any of stations 106a-d, and may be used to transmit and/or receive communications. That is, any of stations 106a-d may serve as transmitter or receiver devices. Certain aspects contemplate signal detector 218 being used by software running on memory 206 and processor 204 to detect the presence of a transmitter or receiver.

As described above, a wireless device, such as wireless device 202, may be configured to provide services within a wireless communication system, such as the wireless communication system 100. For example, the wireless device 202 may include hardware (e.g., a sensor, a global positioning system (GPS), etc.) that is used to capture or calculate data (e.g., sensor measurements, location coordinates, etc.).

As described above, authentication may take place between the STA 106 and the authentication server 108. In some embodiments, the AP 104a of FIG. 1, which may function as an authenticator, relays messages between the STA 106 and the authentication server 108 during the authentication process. In some instances, the authentication messages between the STA 106 and the AP 104a are transported using extensible authentication protocol over local area network (EAPOL) frames. EAPOL frames may be defined in the IEEE 802.11i protocol. The authentication messages between the AP 104a and the authentication server 108 may be transported using the remote authentication dial in user service (RADIUS) protocol or the Diameter authentication, authorization, and accounting protocol.

During the authentication process, the authentication server 108 may take a long time to respond to messages received from the AP 104a. For example, the authentication server 108 may be physically located at a location remote from the AP 104a, so the delay may be attributed to the backhaul link speed. As another example, the authentication server 108 may be processing a large number of authentication requests initiated by STAs 106 and/or APs 104 (e.g., there may be a large number of STAs in a dense area, such as on the train 120, each of which are attempting to establish a connection). Thus, the delay may be attributed to the loading (e.g., traffic) on the authentication server.

Figure 3:
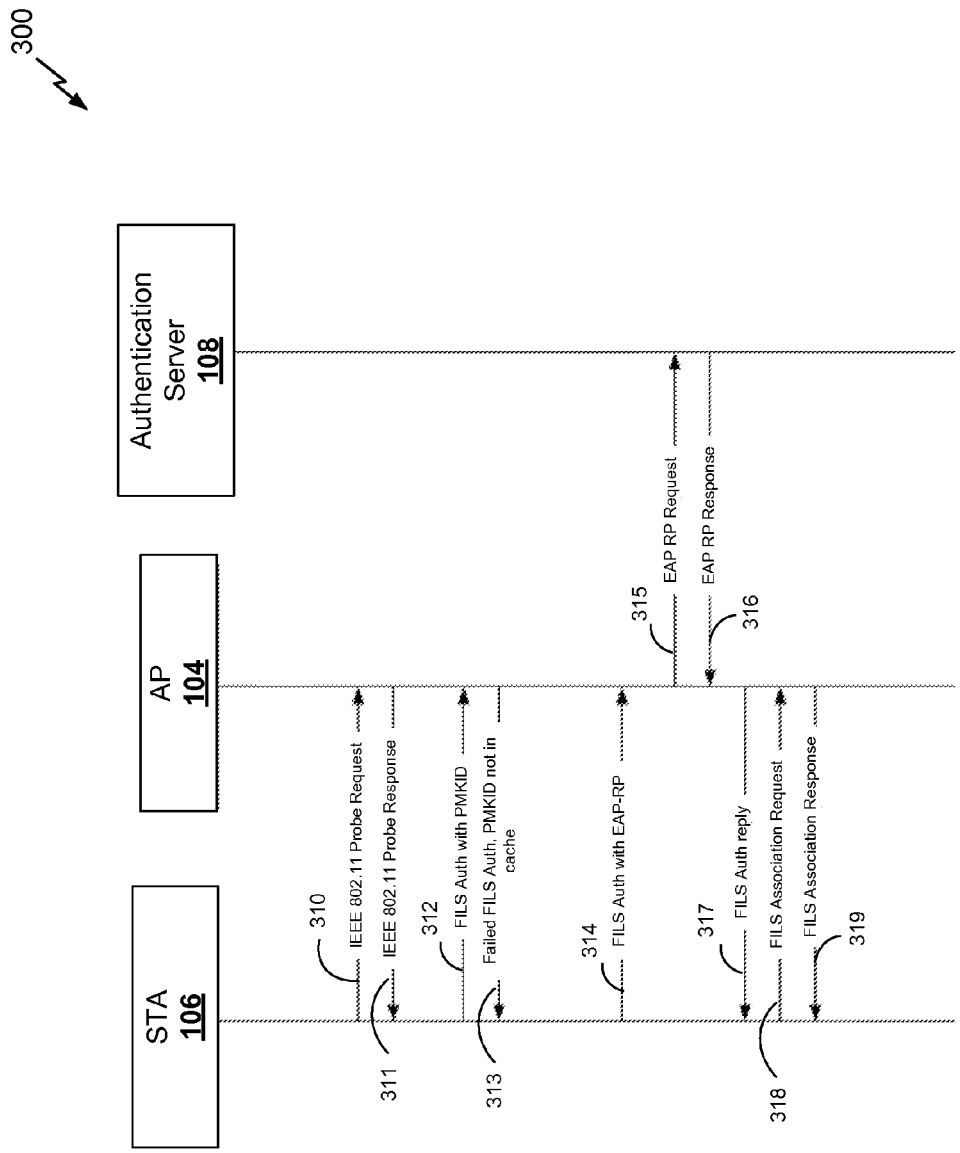
FIG. 3 is a message flow diagram of a communication exchange in a fast initial link setup (FILS) wireless communication system.

FIG. 3 is a message flow diagram of a communication exchange 300 in the wireless communication system 100 of FIG. 1. As illustrated in FIG. 3, the STA 106 (e.g., supplicant) transmits an IEEE 802.11 probe request 310 to the AP 104 (e.g., authenticator) to obtain information from the AP 104. The AP 104 responds with an IEEE 802.11 probe response 311. The STA 106 then transmits a FILS authentication message 312 that includes a pairwise master key identifier (PMKID) to the AP 104. The AP 104 then checks if the PMKID in the FILS authentication message 312 matches it cache. If so, the AP 104 will proceed running the FILS authentication with the cached value. However, if the FILS authentication message 312 does not match the AP 104's cache, the AP 104 sends a failed authentication message 313 indicating that the PMKID in not in the cache.

At this point, the STA 106 may retry FILS authentication with the AP 104 by using an extensible authentication protocol re-authentication protocol (EAP-RP) frame 314 (e.g., EAP-RP wrapped frame). Based on receiving the EAP-RP frame 314, the AP 104 may transmit an EAP-RP authentication request 315 to the authentication server 108, or trusted third party server. The EAP-RP authentication request 315 may be an authentication, authorization, and accounting (AAA) EAP Request (e.g., an EAP payload), which may include the EAP-RP frame 314. As discussed above, the authentication server 108 may take a long period of time to respond to the EAP-RP authentication request 315. Once the authentication server 108 is ready to respond, the authentication server 108 may then transmit an EAP-RP authentication response 316 to the AP 104. The EAP-RP authentication response 316 may be an AAA EAP Answer (e.g., an EAP payload), which may include an indication of whether authentication is successful or is unsuccessful. For example, the indication of whether authentication succeeded or failed may be an EAP success message or an EAP failure message.

Upon receiving the EAP-RP authentication response 316, the AP 104 may transmit an FILS authentication reply message 317 to the STA 106. The FILS authentication reply message 317 may be an EAPOL frame and include an EAP finish-re-authentication message (e.g., which is part of the EAP Re-authentication Protocol), which indicates whether authentication succeeded or failed.

After receiving the FILS authentication reply message 317, the STA 106 may transmit an FILS association request message 318 to the AP 104 in order to associate with the AP 104. The FILS association request message 318 may be an EAPOL frame and include a key confirmation. If association is successful, the AP 104 may respond with an FILS association response message 319. The FILS association response message 319 may be an EAPOL frame and include a key confirmation and/or a group-key distribution, which can be used to encrypt traffic. Once the STA 106 is associated with the AP 104, data protection may be applied for communications between the STA 106 and the AP 104.

As described above, the authentication server 108 may take a long period of time to respond to the EAP-RP authentication request 315. Moreover, the additional handshake of the STA 106 sending the EAP-RP frame 314 to the AP 104 also may cause a delay. The methods, systems, and apparatus disclosed herein provide for improved efficiency of authenticating devices during FILS. In order to prevent the additional handshake, a STA 106 may include both a PMKID and an EAP-RP frame (e.g., EAP-RP wrapped frame) in a FILS authentication message send to the AP 104

Figure 4:
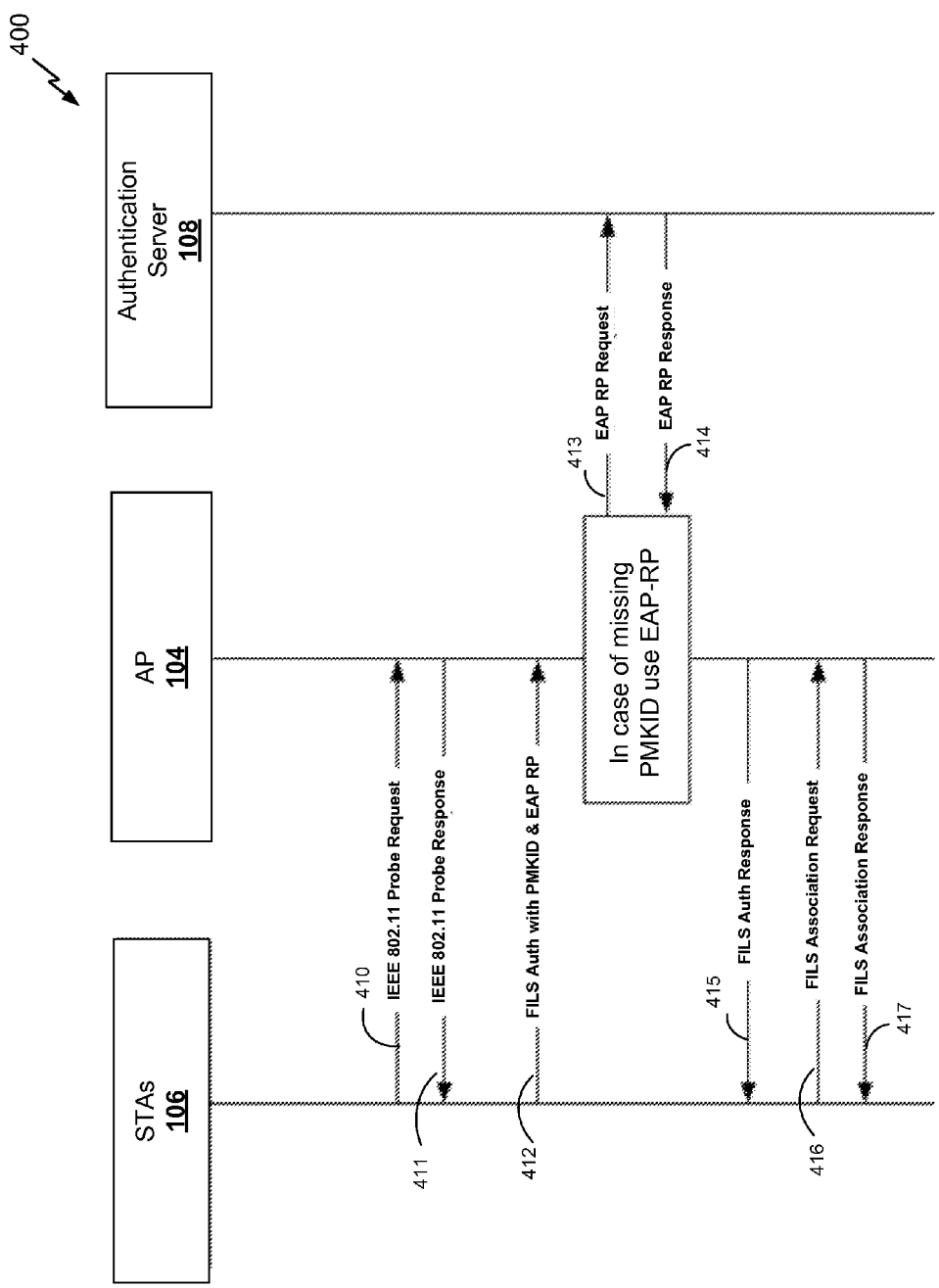
FIG. 4 is a message flow diagram of another exemplary communication exchange in the wireless communication system of FIG. 1.

FIG. 4 shows an exemplary communication exchange 400 in the wireless communication system 100 of FIG. 1. As illustrated in FIG. 4, the STA 106 transmits the IEEE 802.11 probe request message 310 to the AP 104 to obtain information from the AP 104. The AP 104 responds with the IEEE 802.11 probe response message 311. The STA 106 then transmits a FILS authentication message 412 that includes information elements a PMKID (e.g., PMKID list) and EAP-RP frame (e.g., EAP-RP wrapped frame) to the AP 104. The FILS authentication message 412 allows the AP 104 to have the option to choose which authentication method to employ. In some embodiments, the AP 104 may choose to prioritize the usage of the PMKID in case it still has it in its cache. In this embodiment, the AP 104 may only fall back to an EAP-RP handshake if the PMKID fails because an EAP-RP authentication will involve an exchange with the authentication server 108. In other embodiments, the AP 104 may choose to prioritize the usage of the EAP-RP, for example when the authentication server 108 response time is fast.

In the case where the STA 106 PMKID is missing from the AP 104's cache, the AP 104 will send an EAP-RP authentication request 413 to the authentication server 108. The authentication server 108 may then transmit an EAP-RP authentication response 414 to the AP 104. This embodiment avoids the STA 106 having to send a separate EAP-RP frame to the AP 104 (e.g., EAP-RP frame 314).

Upon receiving the EAP-RP authentication response 414, the AP 104 may transmit an FILS authentication reply message 415 to the STA 106. The FILS authentication reply message 415 may be an EAPOL frame and include an EAP finish-re-authentication message (e.g., which is part of the EAP Re-authentication Protocol), which indicates whether authentication succeeded or failed. The FILS authentication reply message 415 may also indicate whether the AP 104 used a pairwise master key (PMK) cache or a fresh EAP-RP. In some embodiments, if a fresh EAP-RP is used, both the AP 104 and STA 106 delete their existing PMK cache and generate another PMKID (e.g., PMK vector or value). In other embodiments, if the PMK cache was used the AP 104 and STA will maintain or keep their PMK vectors or values.

After receiving the FILS authentication reply message 415, the STA 106 may transmit an FILS association request message 416 to the AP 104 in order to associate with the AP 104. If association is successful, the AP 104 may respond with an FILS association response message 417. The FILS association response message 417 may be an EAPOL frame and include a key confirmation and/or a group-key distribution, which can be used to encrypt traffic. Once the STA 106 is associated with the AP 104, data protection may be applied for communications between the STA 106 and the AP 104.

Figure 5:
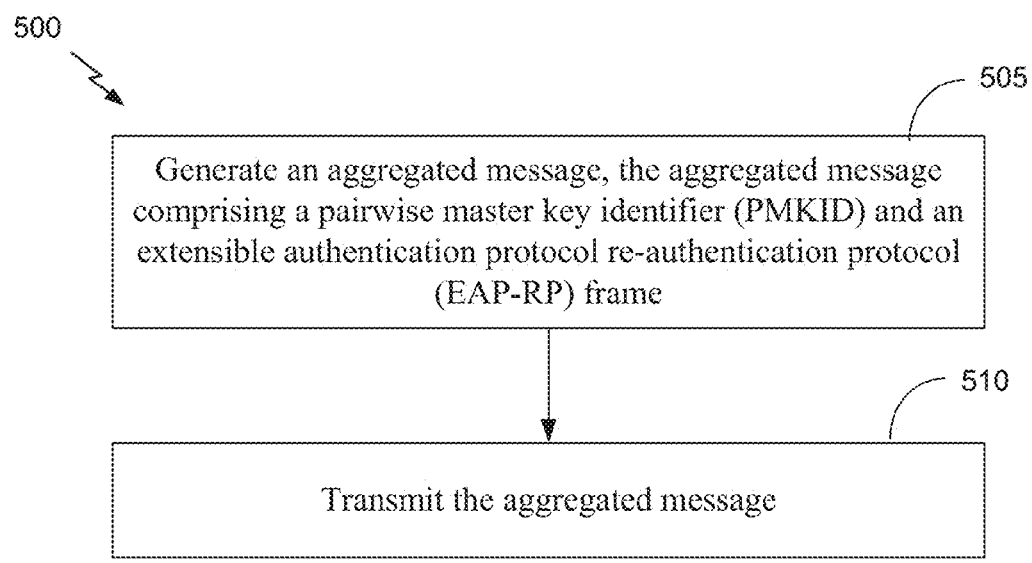
FIG. 5 is a flowchart of an exemplary method for wireless communication.

FIG. 5 is a flowchart of an exemplary method 500 for wireless communication. Method 500 may be performed by the device 202 in some aspects. The method 500 may also be performed by one or more of the STAs 106 or APs 104 shown in FIGS. 1, 3, and 4, a person having ordinary skill in the art will appreciate that the method 500 may be implemented by other suitable devices and systems. Although the method 500 is described herein with reference to a particular order, in various embodiments, blocks herein may be performed in a different order, or omitted, and additional blocks may be added.

Operation block 505 includes generate an aggregated message, the aggregated message comprising a pairwise master key identifier (PMKID) and an extensible authentication protocol re-authentication protocol (EAP-RP) frame. Operation block 510 includes transmit the aggregated message.

In some embodiments, an apparatus for wireless communication may perform one or more of the functions of method 500, in accordance with certain embodiments described herein. The apparatus may comprise means for generating an aggregated message, the aggregated message comprising a pairwise master key identifier (PMKID) and an extensible authentication protocol re-authentication protocol (EAP-RP) frame. In certain embodiments, the means for generating can be implemented by the processor 204 or DSP 220 (FIG. 2). In certain embodiments, the means for generating can be configured to perform the functions of block 505 (FIG. 5). The apparatus may further comprise means for transmitting the aggregated message. In certain embodiments, the means for transmitting can be implemented by the transmitter 210 (FIG. 2). In certain embodiments, the means for transmitting can be configured to perform the functions of block 510 (FIG. 5). The apparatus may further comprise means for maintaining the PMKID based on the response message indicating a use of the PMKID frame. In certain embodiments, the means for maintaining can be implemented by the processor 204 or DSP 220 (FIG. 2). In certain embodiments, the means for maintaining can be configured to perform the functions of keeping or not deleting the PMKID in a cache based on the response message indicating a use of the PMKID frame.

Figure 6:
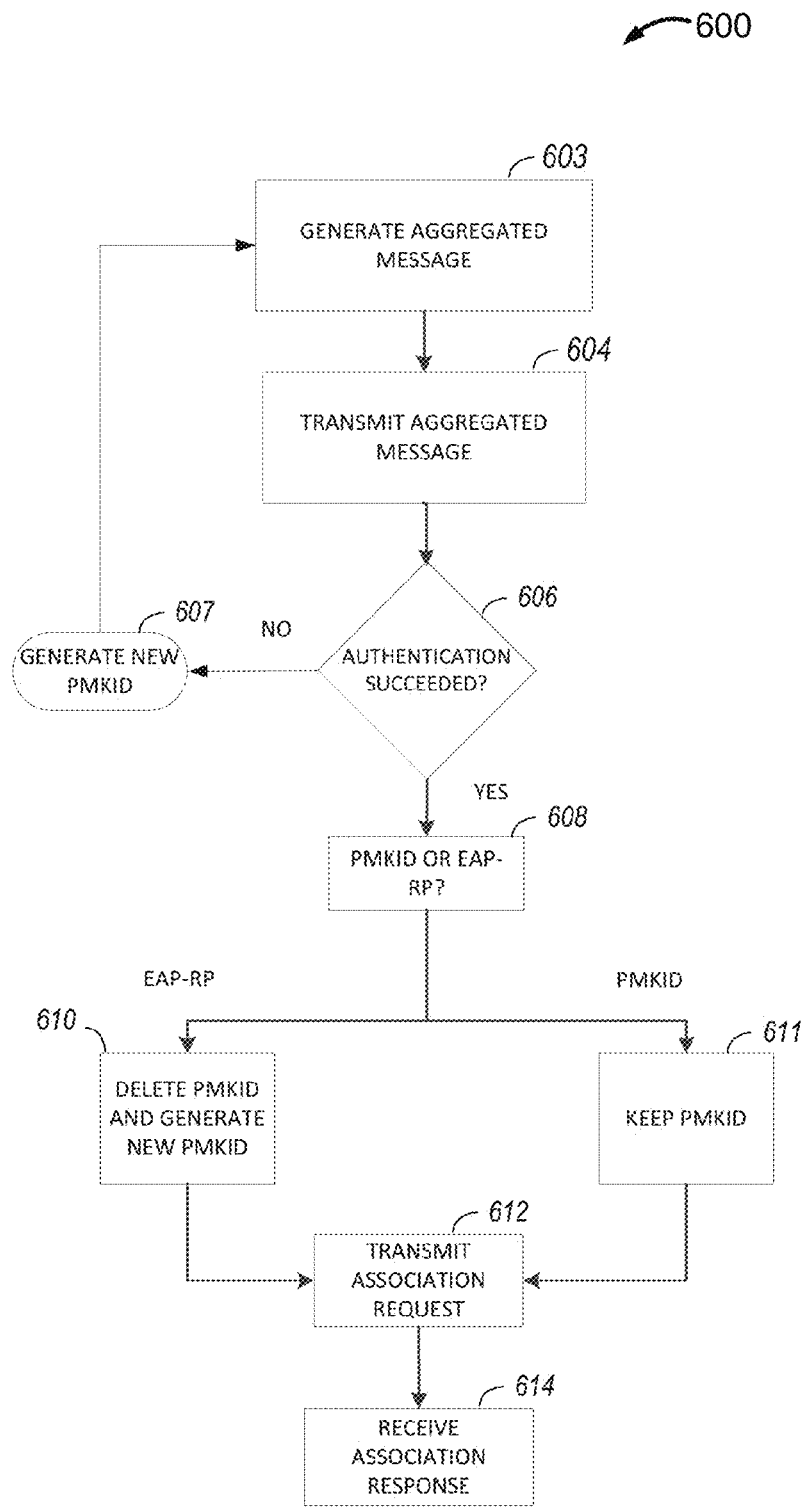
FIG. 6 is a flowchart of an exemplary method for wireless communication.

FIG. 6 is a flowchart of an exemplary method 600 for the STA 106 to communication authentication information to the AP 104. At block 603, the STA 106 generates an aggregated message, the aggregated message comprising a pairwise master key identifier (PMKID) and an extensible authentication protocol re-authentication protocol (EAP-RP) frame. At block 604, the STA 106 transmits the aggregated message to the AP 104 for authentication purposes. At block 606, the STA 106 receives from the AP 104 a response message in response to the aggregated message. The response message indicates whether authentication succeeded or failed. If the authentication failed then the method proceeds to block 607 where the STA 106 generates another PMKID. The method then returns to block 603. If the authentication succeeded then the method continues to block 608. At block 608, the STA 106 determines whether the AP 104 used the PMKID or the EAP-RP frame. The response message may indicate the use of the PMKID or the EAP-RP frame. If the AP 104 used the EAP-RP frame, the STA 106 deletes its existing PMKID and generates another PMKID vector based on the response message indicating the use of the EAP-RP frame, as indicated in block 610. If the AP 104 used PMK caching, the STA 106 maintains its PMKID vector based on the response message indicating the use of the PMKID, as indicated in block 611. At block 612, STA 106 will then transmit an association request message to the AP 104. At block 614, the STA 106 receives an association response message from the AP 104 indicating whether association succeeded or failed.

Figure 7:
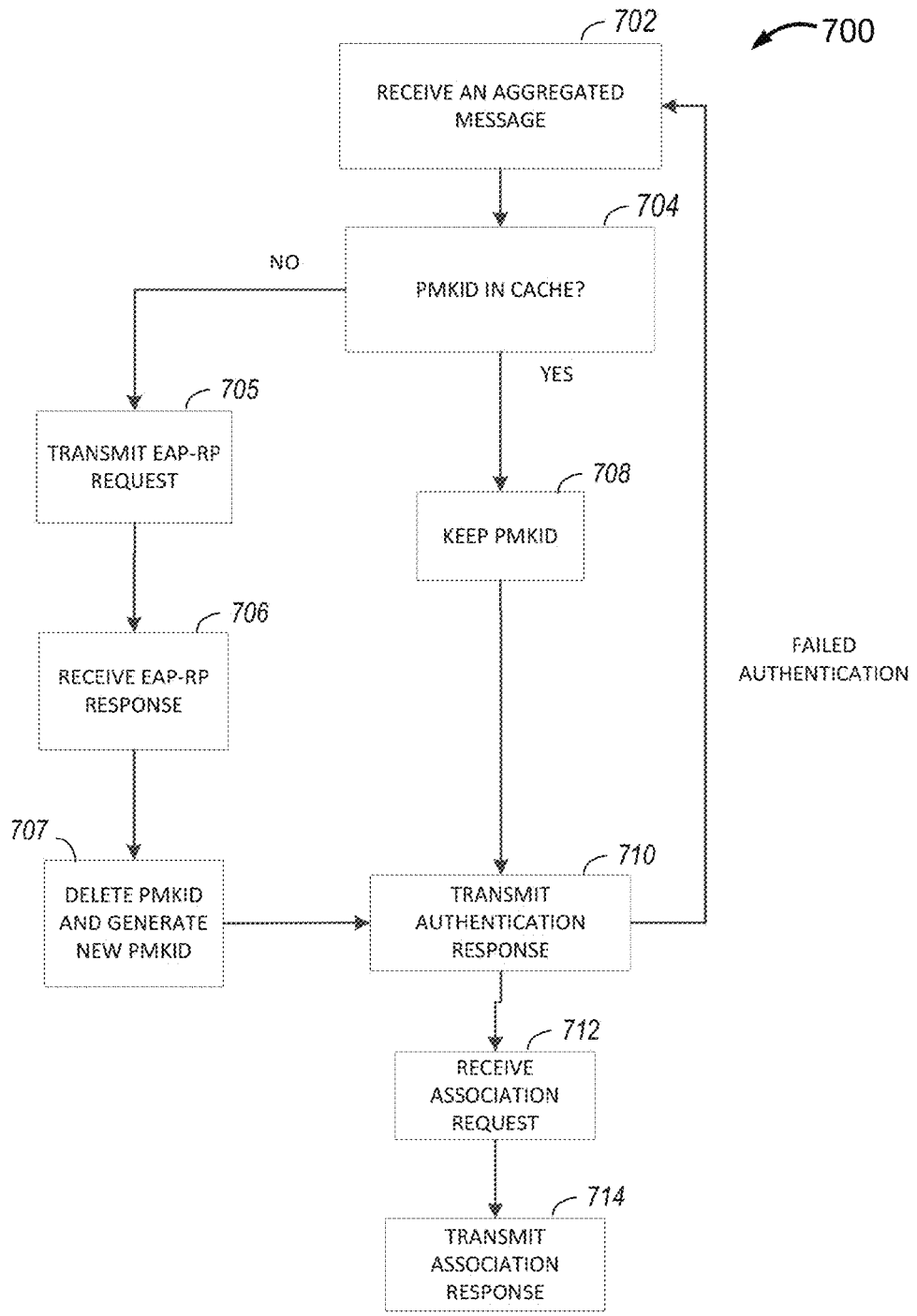
FIG. 7 is a flowchart of an exemplary method for wireless communication.

FIG. 7 is a flowchart of an exemplary method 700 for the AP 104 to authenticate a STA 106. At block 702, the AP 104 receive an aggregated message from the STA 106, the aggregated message comprising a pairwise master key identifier (PMKID) and an extensible authentication protocol re-authentication protocol (EAP-RP) frame. At block 704, the AP 104 determines whether the PMKID in the aggregated message is in the cache of the AP 104. If so, then the AP 104 keeps maintaining the PMKID in its cache, as in block 708. At block 710, AP 104 then sends an authentication response to the STA 106. If the PMKID in the aggregated message is not in the cache of the AP 104, then the AP 104 sends an EAP-RP request to an authentication server, as in block 705. At block 706, the AP 104 receives a response from the authentication server. At block 707, the AP 104 may delete its existing PMKID cache and generate another PMKID vector. The AP 104 may then move to block 710 and transmit the authentication response. The authentication response may indicate whether authentication succeed or failed. If authentication failed, then the method returns to block 702 and waits to receive another aggregated message. If authentication succeed, then at block 712, the AP 104 may receive an association request message from the STA 106. At block 714, the AP 104 transmits an association response message to the STA 106 indicating whether association succeeded or failed.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of wireless communication, comprising:
generating a fast initial link setup FILS authentication message, the FILS authentication message comprising a pairwise master key identifier (PMKID) and an extensible authentication protocol re-authentication protocol (EAP-RP) frame;
transmitting the FILS authentication message;
receiving a response message responsive to the FILS authentication message, the response message indicating a use of the PMKID or the EAP-RP frame;
in response to receiving the response message, transmitting an association request message; and
if association is successful, receiving an association response message in response to the association request message,
wherein if the response message indicates use of the EAP-RP frame from the FILS authentication message, then authentication based on the PMKID from the FILS authentication message was unsuccessful,
wherein if the authentication based on the PMKID from the FILS authentication message was unsuccessful, then generating another PMKID,
wherein if the response message indicates use of the PMKID, then maintaining the PMKID, and
wherein the response message further indicates whether an authentication is successful based on an extensible authentication protocol (EAP) success message.

2. The method of claim 1, further comprising deleting the PMKID based on the response message.

3. The method of claim 2, wherein generating the another PMKID is in response to deleting the PMKID.

4. An apparatus for wireless communication, comprising:
a processor configured to generate a fast initial link setup FILS authentication message, the FILS authentication aggregated message comprising a pairwise master key identifier (PMKID) and an extensible authentication protocol re-authentication protocol (EAP-RP) frame;
a transmitter configured to transmit the FILS authentication message;
a receiver configured to receive a response message responsive to the FILS authentication message, the response message indicating a use of the PMKID or the EAP-RP frame;
in response to receiving the response message, the transmitter is further configured to transmit an association request message; and
if association is successful, the receiving is further configured to receive an association response message in response to the association request message,
wherein if the response message indicates use of the EAP-RP frame from the FILS authentication message, then authentication based on the PMKID from the FILS authentication message was unsuccessful,
wherein if the authentication based on the PMKID from the FILS authentication message was unsuccessful, then the processor is further configured to generate another PMKID,
wherein if the response message indicates use of the PMKID, then the processor is further configured to maintain the PMKID, and
wherein the response message further indicates whether an authentication is successful based on an extensible authentication protocol (EAP) success message.

5. The apparatus of claim 4, wherein the processor is further configured to delete the PMKID based on the response message.

6. The apparatus of claim 5, wherein the processor generates the another PMKID in response to deleting the PMKID.

7. An apparatus for wireless communication, comprising:
means for generating a fast initial link setup FILS authentication message, the FILS authentication message comprising a pairwise master key identifier (PMKID) and an extensible authentication protocol re-authentication protocol (EAP-RP) frame;
means for transmitting the authentication message;
means for receiving a response message responsive to the FILS authentication message, the response message indicating a use of the PMKID or the EAP-RP frame;
in response to receiving the response message, the means for transmitting further transmit an association request message; and
if association is successful, the means for receiving further receives an association response message in response to the association request message,
wherein if the response message indicates use of the EAP-RP frame from the FILS authentication message, then authentication based on the PMKID from the FILS authentication message was unsuccessful,
wherein if the authentication based on the PMKID from the FILS authentication message was unsuccessful, then the means for generating generates another PMKID,
wherein if the response message indicates use of the PMKID, then the means for generating maintains the PMKID, and
wherein the response message further indicates whether an authentication is successful based on an extensible authentication protocol (EAP) success message.

8. The apparatus of claim 7, further comprising means for deleting the PMKID based on the response message.

9. The apparatus of claim 8, wherein the means for generating generates the another PMKID in response to deleting the PMKID.

10. A non-transitory computer readable storage medium comprising instructions that when executed cause a processor to perform a method of wireless communication, the method comprising:
   generating a fast initial link setup FILS authentication message, the FILS authentication message comprising a pairwise master key identifier (PMKID) and an extensible authentication protocol re-authentication protocol (EAP-RP) frame;
   transmitting the FILS authentication message;
   receiving a response message responsive to the FILS authentication message, the response message indicating a use of the PMKID or the EAP-RP frame;
   in response to receiving the response message, transmitting an association request message; and
   if association is successful, receiving an association response message in response to the association request message,
   wherein if the response message indicates use of the EAP-RP frame from the FILS authentication message, then authentication based on the PMKID from the FILS authentication message was unsuccessful,
   wherein if the authentication based on the PMKID from the FILS authentication message was unsuccessful, then generating another PMKID,
   wherein if the response message indicates use of the PMKID, then maintaining the PMKID, and
   wherein the response message further indicates whether an authentication is successful based on an extensible authentication protocol (EAP) success message.

11. The non-transitory computer readable storage medium of claim 10, the method further comprising deleting the PMKID based on the response message.

12. The non-transitory computer readable storage medium of claim 11, wherein generating the another PMKID is in response to deleting the PMKID.

* * * * *